United States Patent
Izumi

(10) Patent No.: US 7,974,799 B2
(45) Date of Patent: Jul. 5, 2011

(54) BACKBOARD TRANSMISSION METHOD, BACKBOARD TRANSMISSION APPARATUS, AND SUBSTRATE UNIT

(75) Inventor: Futoshi Izumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1116 days.

(21) Appl. No.: 11/438,349

(22) Filed: May 23, 2006

(65) Prior Publication Data

US 2007/0192051 A1    Aug. 16, 2007

(30) Foreign Application Priority Data

Feb. 14, 2006   (JP) ................................. 2006-037222

(51) Int. Cl.
*G01R 13/00*    (2006.01)
(52) U.S. Cl. .......................................................... 702/69
(58) Field of Classification Search ..................... 702/89
See application file for complete search history.

(56) References Cited

U.S. PATENT DOCUMENTS

| | | | | |
|---|---|---|---|---|
| 6,628,779 | B1 * | 9/2003 | Pietrowicz | 379/404 |
| 6,693,883 | B2 * | 2/2004 | Abe et al. | 370/276 |
| 2003/0038659 | A1 * | 2/2003 | Takahashi et al. | 327/141 |
| 2003/0123649 | A1 * | 7/2003 | Casper | 379/406.01 |
| 2004/0001450 | A1 * | 1/2004 | He et al. | 370/286 |
| 2004/0120391 | A1 * | 6/2004 | Lin et al. | 375/219 |
| 2004/0213170 | A1 * | 10/2004 | Bremer | 370/282 |
| 2004/0246032 | A1 * | 12/2004 | Ogiso et al. | 327/141 |
| 2005/0052941 | A1 * | 3/2005 | Nakamura et al. | 365/232 |
| 2005/0100083 | A1 * | 5/2005 | Takatori et al. | 375/220 |
| 2005/0152488 | A1 * | 7/2005 | Buckwalter et al. | 375/350 |

FOREIGN PATENT DOCUMENTS

| | | |
|---|---|---|
| JP | 56-001634 A | 1/1981 |
| JP | 61-242174 A | 10/1986 |
| JP | 2004-281960 A | 10/2004 |

OTHER PUBLICATIONS

"Catalog of OMG IDL/Language Mappings Specification" [online] Mitsubishi Denki Kabushiki Kaisha https://www.mitsubishielectric.co.jp/news-data/2003/pdf/1002-b.pdf (submitted as "Potential Reduction in Size and Cost for Communication Network Repeater Units and Mobile Phone Base Station Units" (Fig. 1(a) and Fig. 1(b)).

\* cited by examiner

*Primary Examiner* — Aditya Bhat
(74) *Attorney, Agent, or Firm* — Fujitsu Patent Center

(57) ABSTRACT

A substrate unit and other substrate unit are mounted with integrated circuits and are connected to a backboard via respective connectors. The substrate unit monitors a signal wave passed between the substrate unit and other substrate unit and detects a delay time and a gain of a reflected wave with respect to a signal wave, performs delay adjustment with respect to a cancellation wave based on the detected delay time, performs gain adjustment with respect to the cancellation wave based on the detected gain, and superimposes the processed cancellation wave on the signal wave thereby canceling the reflected wave.

27 Claims, 17 Drawing Sheets

BACKBOARD TRANSMISSION METHOD, BACKBOARD TRANSMISSION APPARATUS, AND SUBSTRATE UNIT

BACKGROUND OF THE INVENTION

1. Field of the Invention

The present invention generally relates to a technology for connecting a transmission-side unit having integrated circuits and a reception-side unit having integrated circuits with respective connectors to a backboard, and more specifically relates to canceling a reflected wave that generates in the connectors and gets superimposed on a signal wave.

2. Description of the Related Art

Conventionally, in general, an electronic device is constituted by connecting substrate units mounted with electronic circuits including integrated circuits via a back board. Connectors in which output terminal pins of the substrate units are inserted are arranged on the backboard. When the output terminal pins are inserted in the connectors, the substrate units and the backboard are electrically connected. Communication between the substrate units via the backboard is referred to as backboard transmission.

A repeater of a communication network is explained as an example of the electronic device. According to the increase in traffic, improvement of processing ability of the repeater is attempted. Conventionally, in general, the number of channels of the repeater is increased to improve the processing ability of the repeater. However, when the number of channels is increased, the number of components of the repeater is also increased. As a result, a size of the repeater is increased.

On the other hand, to improve the processing ability without causing the increase in size of the repeater, it is attempted to improve a processing rate of one channel without increasing the number of channels. However, reliability of high-speed communication in the backboard transmission hinders the improvement of a processing rate of a channel.

The substrate units and the backboard are connected by fitting pins in holes called through-holes. However, there are portions where the pins and the through-holes are in contact with each other and portions where the pins and the through-holes are not in contact with each other. Thus, the portions where the pins and the through-holes are not in contact with each other are bypassed in terms of an electric circuit. The portions are called stubs.

In the high-speed communication in the backboard transmission, a delay wave generated in the stubs is superimposed on a direct wave to be noise. A gain of communication signals carried by the direct waves is damaged by this noise. In other words, the noise hinders an increase in speed of the backboard transmission and spoils reliability of the high-speed communication.

To cope with such a problem, for example, a backboard transmission method including connectors for connecting substrate units and a backboard that can prevent stubs from being formed and prevent a delay wave from being generated is disclosed in Mitsubishi Electric Corporation, "Transmission between boards in a repeater at speed of 10 Gbps and a distance of 50 mm was demonstrated for the first time in the world", [online], Oct. 2, 2003, news release, [retrieved Feb. 1, 2006], Internet URL:http://www.mitsubishielectric.co.jp\news-data/2003/pdf/1002-b.pdf. According to this backboard transmission method, it is possible to prevent noise and a loss of gain of communication signals and secure reliability of the high-speed communication.

However, in the technology represented by the document described above, reliability of high-speed communication at about 10 Gpbs is only secured. The technology is not applicable to high-speed communication at higher speed in recent years. Specifically, in the high-speed communication in the backboard transmission, an influence on reflected waves due to impedance mismatching between the substrate units and the connector sections is a significant problem.

In low-speed communication, the influence of reflected waves occurs in one time slot and the reflected waves affect only a waveform of a pulse of one bit. However, in the high-speed communication, since a time slot is reduced, the reflected waves affect a pulse of a plurality of bits in a plurality of time slots. This makes it impossible to accurately receive the bits of the pulses.

Therefore, there is need of a technology that can eliminate the influence of reflected waves due to impedance mismatching in the connector sections in the backboard transmission at higher speed, accurately receive pulses, and accurately discriminate bits.

SUMMARY OF THE INVENTION

It is an object of the present invention to at least partially solve the problems in the conventional technology.

According to an aspect of the present invention, a backboard transmission method includes monitoring a signal wave passed between a transmission-side substrate unit and a reception-side substrate unit and detects a delay time and a gain of a reflected wave with respect to the signal wave, wherein the transmission-side substrate unit and the reception-side substrate unit are mounted with integrated circuits and are connected to a backboard via respective connectors; performing delay adjustment with respect to a cancellation wave having a characteristic identical with that of the signal wave based on the delay time detected at the monitoring; performing gain adjustment with respect to the cancellation wave based on the gain detected at the monitoring; and superimposing the cancellation wave subjected to the delay adjustment and the gain adjustment on the signal wave thereby canceling the reflected wave.

According to another aspect of the present invention, a backboard transmission apparatus includes a signal-wave monitoring unit that monitors a signal wave passed between a transmission-side substrate unit and a reception-side substrate unit and detects a delay time and a gain of a reflected wave with respect to the signal wave, wherein the transmission-side substrate unit and the reception-side substrate unit are mounted with integrated circuits and are connected to a backboard via respective connectors; a delay adjusting unit that performs delay adjustment with respect to a cancellation wave having a characteristic identical with that of the signal wave based on the delay time detected by the signal-wave monitoring unit; a gain adjusting unit that performs gain adjustment with respect to the cancellation wave based on the gain detected by the signal-wave monitoring unit; and a reflected-wave canceling unit that superimposes the cancellation wave subjected to the delay adjustment by the delay adjusting unit and the gain adjustment by the gain adjusting unit on the signal wave thereby canceling the reflected wave.

According to still another aspect of the present invention, a substrate unit includes a signal-wave monitoring unit that monitors a signal wave passed between the substrate unit and other substrate unit and detects a delay time and a gain of a reflected wave with respect to the signal wave, wherein the substrate unit and the other substrate unit are mounted with integrated circuits and are connected to a backboard via respective connectors; a delay adjusting unit that performs delay adjustment with respect to a cancellation wave having a characteristic identical with that of the signal wave based on the delay time detected by the signal-wave monitoring unit; a gain adjusting unit that performs gain adjustment with respect to the cancellation wave based on the gain detected by the signal-wave monitoring unit; and a reflected-wave canceling unit that superimposes the cancellation wave subjected to the delay adjustment by the delay adjusting unit and the gain adjustment by the gain adjusting unit on the signal wave thereby canceling the reflected wave.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

It is assumed that backboard transmission in the present invention transmits a digital signal according to serial communication. However, the present invention is not limited to this. The backboard transmission may supply electric power. In a first embodiment of the present invention described below, a backboard transmission method of monitoring characteristics of reflected waves in a substrate unit on a reception side and canceling the reflected waves based on a result of the monitoring is described. In a second embodiment of the present invention, various modifications of the backboard transmission method or the like of monitoring characteristics of reflected waves in a substrate unit on a reception side and canceling the reflected waves based on a result of the monitoring are described.

Figure 1:
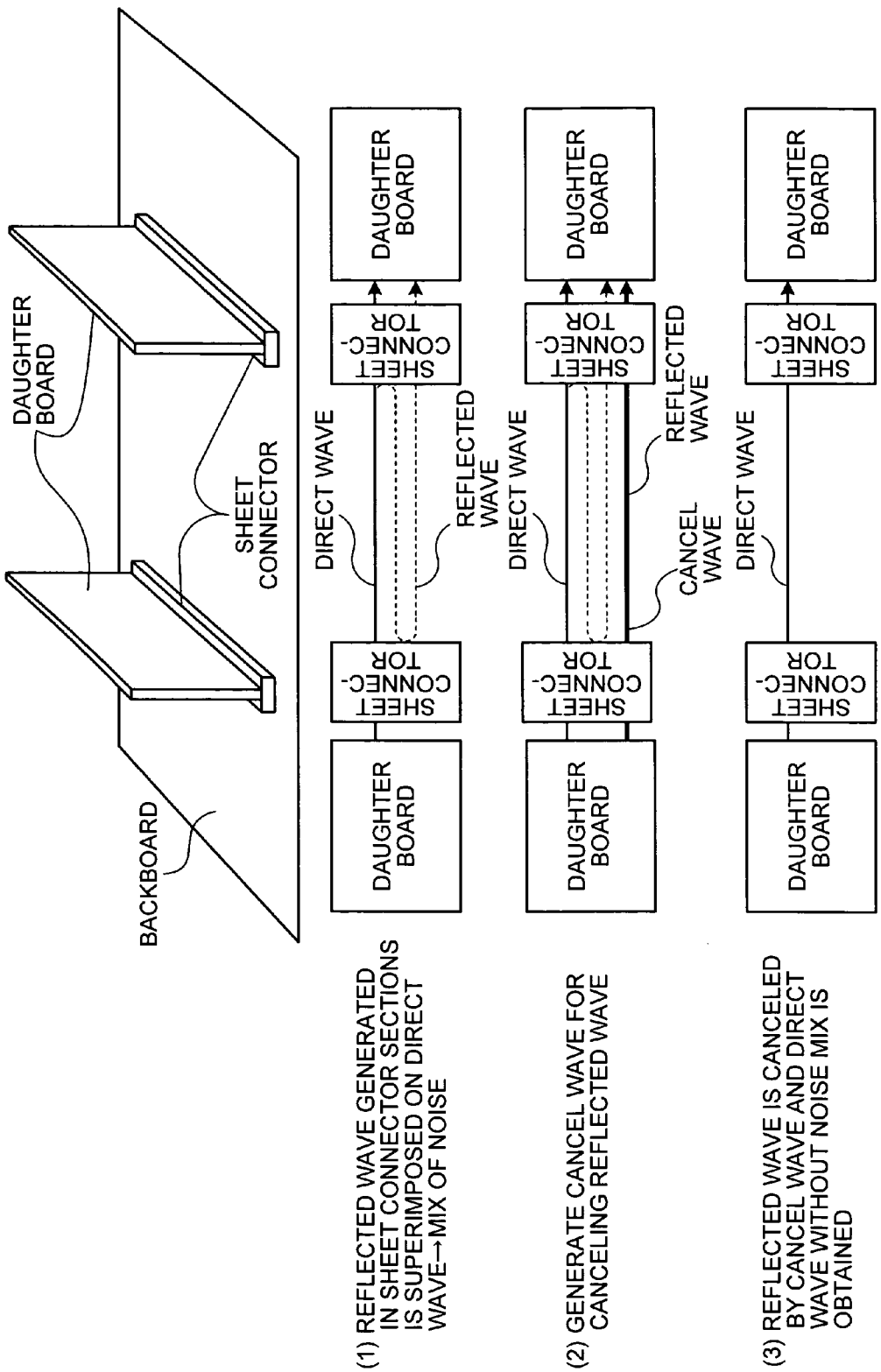
FIG. 1 is a diagram for explaining an overview of an embodiment of the present invention.

FIG. 1 is a diagram for explaining an overview of the backboard transmission method according to the present invention. As shown in the figure, two daughter boards (substrate units) are inserted in sheet connectors (connectors) of a backboard (Back Wired Board (BWB)) to be perpendicular to the backboard. The daughter boards are mounted with integrated circuits like LSIs. In this way, the two daughter boards are connected as electric circuits via the backboard.

In the figure, for simplification of explanation, the two daughter boards are connected to the backboard. However, in general, two or more daughter boards are connected to the backboard. In the first embodiment of the present invention, the illustration is simplified in this way to explain cancellation of reflected waves generated in communication between the two daughter boards.

In the conventional backboard transmission method, a direct wave of a signal transmitted from a transmission-side daughter board is reflected on a sheet connector of a reception-side daughter board to generate a reflected wave. The reflected wave is generated because backboard impedance of a circuit that forms a channel on the backboard does not match impedance of the sheet connector. On the other hand, in a section from an output pin of an integrated circuit of the daughter board to the sheet connector, it is possible to perform impedance matching by reducing a distance between the output pin and the sheet connector and interposing a buffer in the section to prevent the generation of the reflected wave. The reflected wave is propagated backward on the channel of the direct wave and is further reflected on the sheet connector of the transmission-side daughter board to generate a further reflected wave. The reflected wave is superimposed on the direct wave to form noise that breaks a waveform of the direct wave ((1) in FIG. 1).

Thus, in the backboard transmission method of the present invention, a cancellation wave having a characteristic capable of canceling a second reflected wave is generated and superimposed on a direct wave on which a reflected wave is superimposed ((2) in FIG. 1). The reflected wave is canceled by the cancellation wave and a direct wave without noise mix is obtained ((3) in FIG. 1). The present invention is characterized in that the reflected wave is removed from the direct wave in this way.

Figure 2:
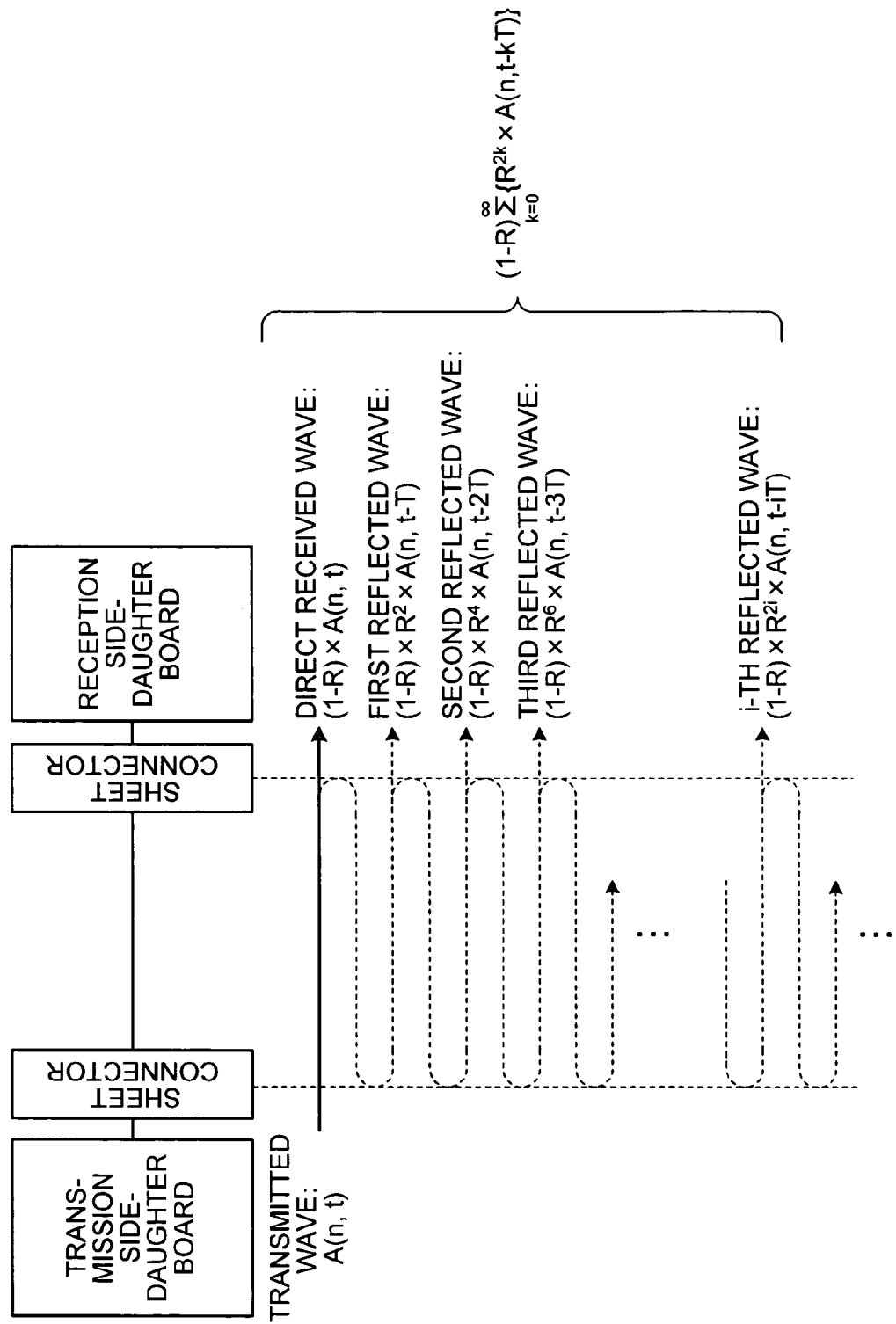
FIG. 2 is a diagram for explaining a situation in which reflected waves are superimposed on a direct wave.

The superimposition of a reflected wave on a direct wave shown in FIG. 1 is explained. FIG. 2 is a diagram for explaining a situation in which reflected waves are superimposed on a direct wave. It is assumed that two sheet connectors on a transmission side and a reception side shown in the figure have an identical characteristic. As shown in the figure, a pulse wave A(n,t) represented by a function of n (a bit number) and t (time) is transmitted from the transmission-side daughter board as a communication signal. When reflectance of a pulse wave on a sheet connector is R, in the pulse wave A(n,t) transmitted, a direct received wave that reaches the reception side sheet connector as a direct wave is represented by Equation 1.

$$(1-R) \times A(n,t) \tag{1}$$

A reflected wave reflected on the sheet connector of the reception-side daughter board travels backward on the channel between the transmission-side daughter board and the reception-side daughter board and is further reflected on the sheet connector of the transmission-side daughter board. Time from the reflection on the sheet connector of the reception-side daughter board to the reflection on the sheet connector of the transmission-side daughter board is T. A gain of this reflected wave is lost because of the reflection on the sheet connector on the reception side. In other words, a first reflected wave reflected on the sheet connectors twice, a gain of which is lost on the reception side sheet connector, delays by the time T. Thus, the first reflected wave is represented by Equation 2.

$$(1-R) \times R^2 \times A(n, t-T) \quad (2)$$

It is assumed that reflection of a reflected wave on the transmission side sheet connector after being reflected on the reception side sheet connector means that the reflected wave is reflected once. Then, an i-th reflected wave generated by i-th reflection when an (i−1)-th reflected wave is further reflected on the reception side sheet connector and the transmission side sheet connector once, respectively, is represented by Equation (3).

$$(1-R) \times R^{2i} \times A(n, t-iT) \quad (3)$$

Therefore, since all i-th reflected waves (i=0, 1, ..., ∞) are superimposed on the direct received wave, a transmitted wave affected by the reflection waves is represented by the following equation. Reflected waves superimposed on the direct received wave to cause signal irregularity are limited to those having gains equal to or larger than a predetermined threshold value that could be recognized as bit-on. Therefore, all the i-th reflected waves (i=0, 1, ..., ∞) are not superimposed on the direct received wave. Only the i-th reflected waves with i equal to or smaller than a predetermined value are superimposed on the direct received wave. However, in the first embodiment; for convenience of explanation, it is assumed that comparison of a gain of a reflected wave and the predetermined threshold value is not taken into account.

$$(1-R) \sum_{k=0}^{\infty} \{R^{2k} \times A(n, t-kT)\} \quad (4)$$

Figure 3:
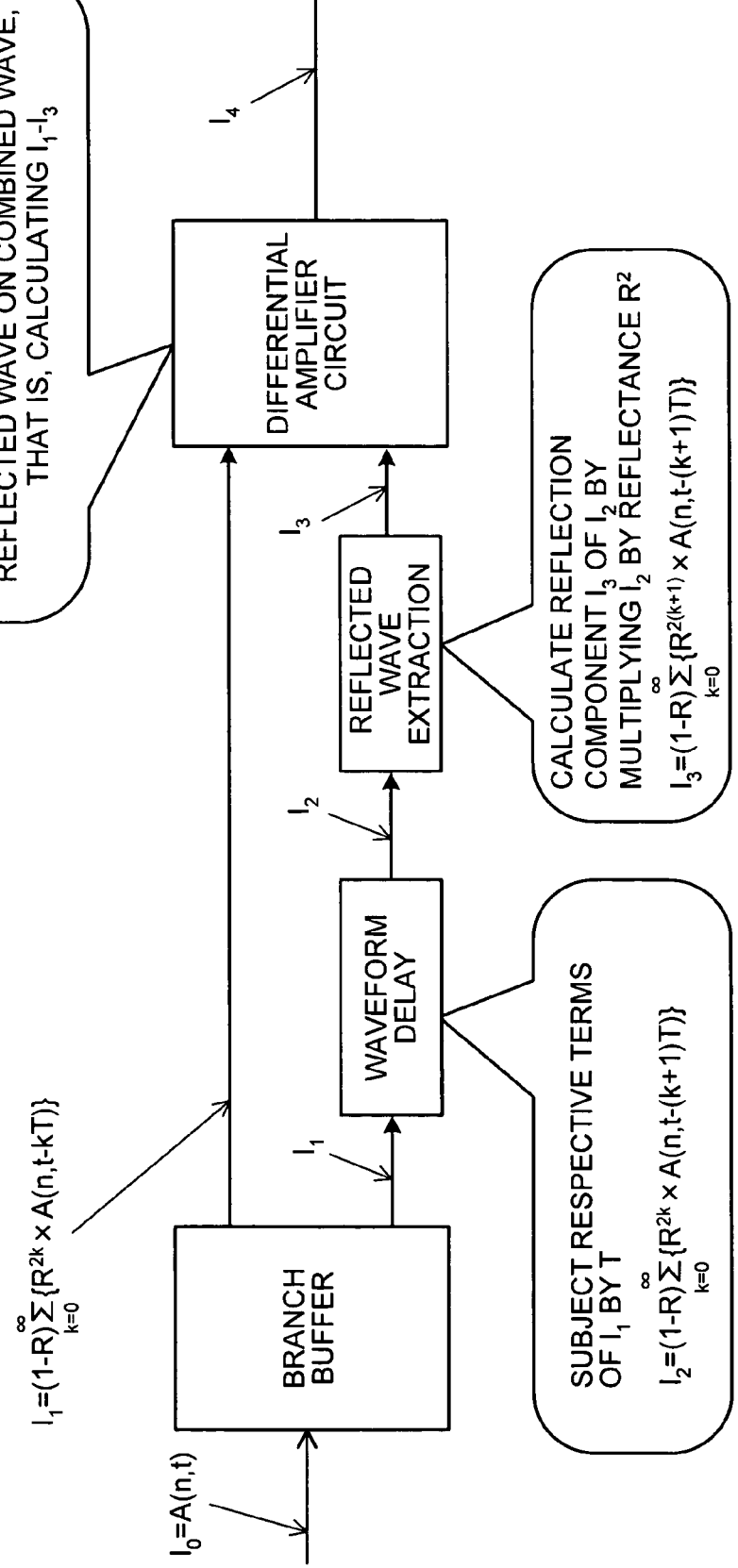
FIG. 3 is a diagram for explaining characteristics of an embodiment the present invention.

Characteristics of the embodiment are explained. FIG. 3 is a diagram for explaining the characteristics of the embodiment. As shown in the figure, an output wave represented by $I_0 = A(n,t)$ is inputted to a branch buffer and transmitted waves $I_1$ superimposed with a reflected wave are branched to two directions. $I_1$ is represented by Equation (5).

$$I_1 = (1-R) \sum_{k=0}^{\infty} \{R^{2k} \times A(n, t-kT)\} \quad (5)$$

One transmitted wave $I_1$ is directly inputted to a differential amplifier circuit. The other transmitted wave $I_1$ is subjected to waveform delay processing first. The waveform delay processing is processing for delaying respective terms of $I_1$ by T. Consequently, a transmitted wave $I_2$ subjected to the waveform delay processing is represented by Equation (6).

$$I_2 = (1-R) \sum_{k=0}^{\infty} \{R^{2k} \times A(n, t-(k+1)T)\} \quad (6)$$

Reflected wave extraction processing is applied to the transmitted wave $I_2$. In the reflected wave extraction processing, a reflection component $I_3$ of the transmitted wave $I_2$ is calculated by multiplying $I_2$ by $R^2$. A transmitted wave $I_3$ subjected to the reflected wave extraction processing is represented by Equation (7).

$$I_3 = (1-R) \sum_{k=0}^{\infty} \{R^{2(k+1)} \times A(n, t-(k+1)T)\} \quad (7)$$

The transmitted wave $I_3$ is inputted to the differential amplifier circuit, subjected to output inversion, and superimposed on the transmitted wave $I_1$ separately inputted. In other words, it is possible to extract a direct wave component $I_4$ by calculating $I_1-I_3$ as shown in Equation (8).

$$I_4 = (1-R_1) \times A(n,t) \quad (8)$$

Figure 4:
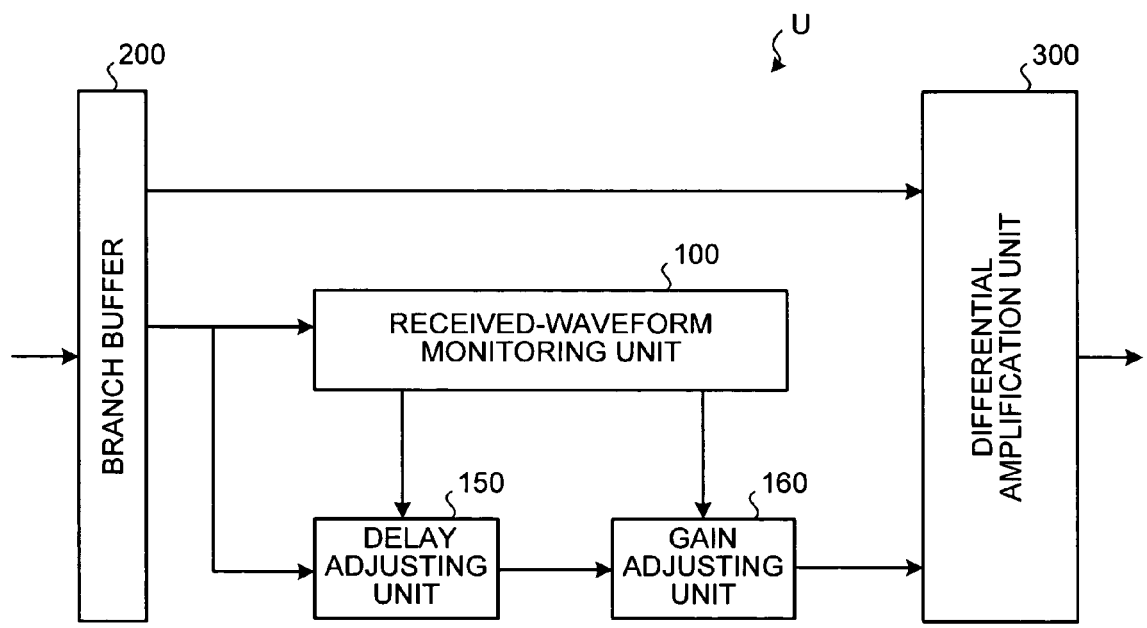
FIG. 4 is a diagram of a constitution of a reflected wave cancellation circuit.

A constitution of a reflected wave cancellation circuit according to the first embodiment is explained. FIG. 4 is a diagram of the constitution of the reflected wave cancellation circuit. As shown in the figure, a reflected wave cancellation circuit U includes a received-waveform monitoring unit 100, a delay adjusting unit 150, a gain adjusting unit 160, a branch buffer 200, and a differential amplification unit 300. The reflected wave cancellation circuit U is formed over the transmission-side daughter board, the back board, the reception-side daughter board. In a conceptual constitution, any component may be mounted on any board.

The branch buffer 200 is a buffer that branches an output wave from the integrated circuit of the transmission-side daughter board inputted into two. The branch buffer 200 also carries out a role of an amplifier that increases a gain of the output waves branched. The branched two output waves have an identical characteristic. One branched output, that is, a first branched output, is inputted to the differential amplification unit 300 and the other branched output, that is, a second branched output, is inputted to the received-waveform monitoring unit 100 and the delay adjusting unit 150.

The received-waveform monitoring unit 100 detects a delay time T of a delay wave superimposed on the second branched output wave and reflectance R indicating a degree of attenuation of a gain. The delay time T and the reflectance R are inputted to the delay adjusting unit 150 and the gain adjusting unit 160, respectively. The delay adjusting unit 150 receives the input of the delay time T and performs delay adjustment for the second branched output wave. The gain adjusting unit 160 receives the reflectance R and performs gain adjustment for the second branched output wave.

The differential amplification unit 300 receives the input of the first branched output wave and the second branched output wave subjected to the gain adjustment by the gain adjusting unit 160. The differential amplification unit 300 superimposes the second branched output wave subjected to output inversion on the first branched output wave to obtain an output wave with a reflected wave component cancelled.

Figure 5:
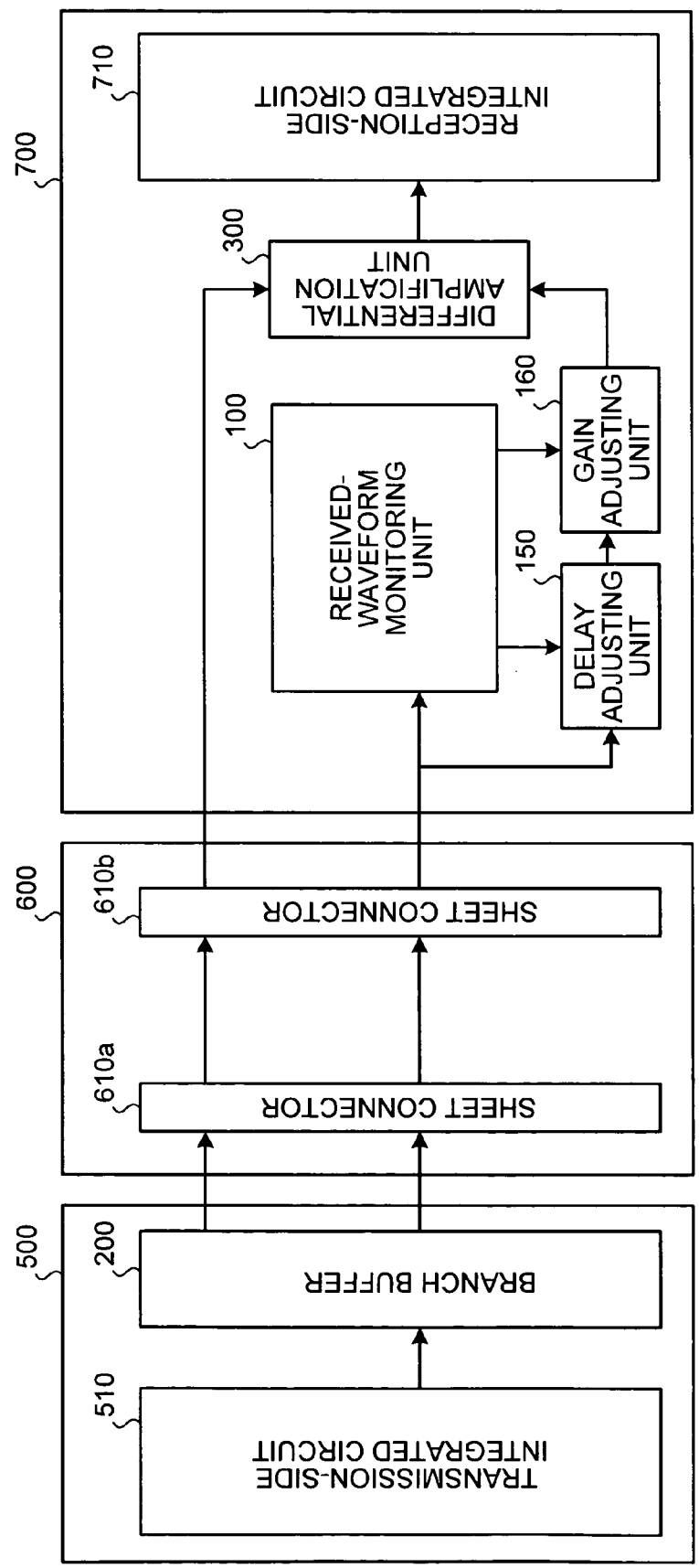
FIG. 5 is a functional block diagram of a constitution of a reflected wave cancellation circuit between daughter boards connected via a backboard.

A constitution in which the reflected wave cancellation circuit U shown in FIG. 4 is packaged is explained. FIG. 5 is a functional block diagram of a constitution of a reflected wave cancellation circuit between daughter boards connected via a backboard. As shown in the figure, the reflected wave cancellation circuit U includes a transmission-side daughter board 500 that has a transmission side integrated circuit 510 and the branch buffer 200, a backboard 600 that has sheet connectors 610a and 610b, and a reception-side daughter board 700 that has the received-waveform monitoring unit 100, the delay adjusting unit 150, the gain adjusting unit 160, the differential amplification unit 300, and a reception side integrated circuit 710.

The transmission side integrated circuit 510 is an electronic component that has a large number of signal output terminals such as an LSI. A digital signal carried by a serial wave is outputted from the signal output terminals. A signal wave outputted from the signal output terminals of the transmission side integrated circuit 510 is inputted to the branch buffer 200 and branched into a first branched output wave and a second branched output wave that have an identical characteristic. The first and the second branched output waves pass through a wiring circuit of the backboard 600 from the sheet connector 610a to be inputted to the reception-side daughter board 700 from the sheet connector 610b, respectively.

The first branched output wave inputted to the reception-side daughter board 700 is directly inputted to the differential amplification unit 300. On the other hand, the second branched output wave inputted to the reception-side daughter board 700 is inputted to the received-waveform monitoring unit 100 and the delay adjusting unit 150. The delay adjusting unit 150, which receives the input of the delay time T from the received-waveform monitoring unit 100, performs delay adjustment for the second branched output wave. The gain adjusting unit 160, which receives the input of the reflectance R from the received-waveform monitoring unit 100, performs gain adjustment for the second branched output wave subjected to the delay adjustment by the delay adjusting unit 150. The differential amplification unit 300 receives the input of the first branched output and the second branched output wave subjected to the gain adjustment by the gain adjusting unit 160 and extracts a direct wave with a reflected wave component cancelled. The direct wave with the reflected wave component cancelled is received by the reception side integrated circuit 710 and predetermined digital information is accurately passed.

Figure 6:
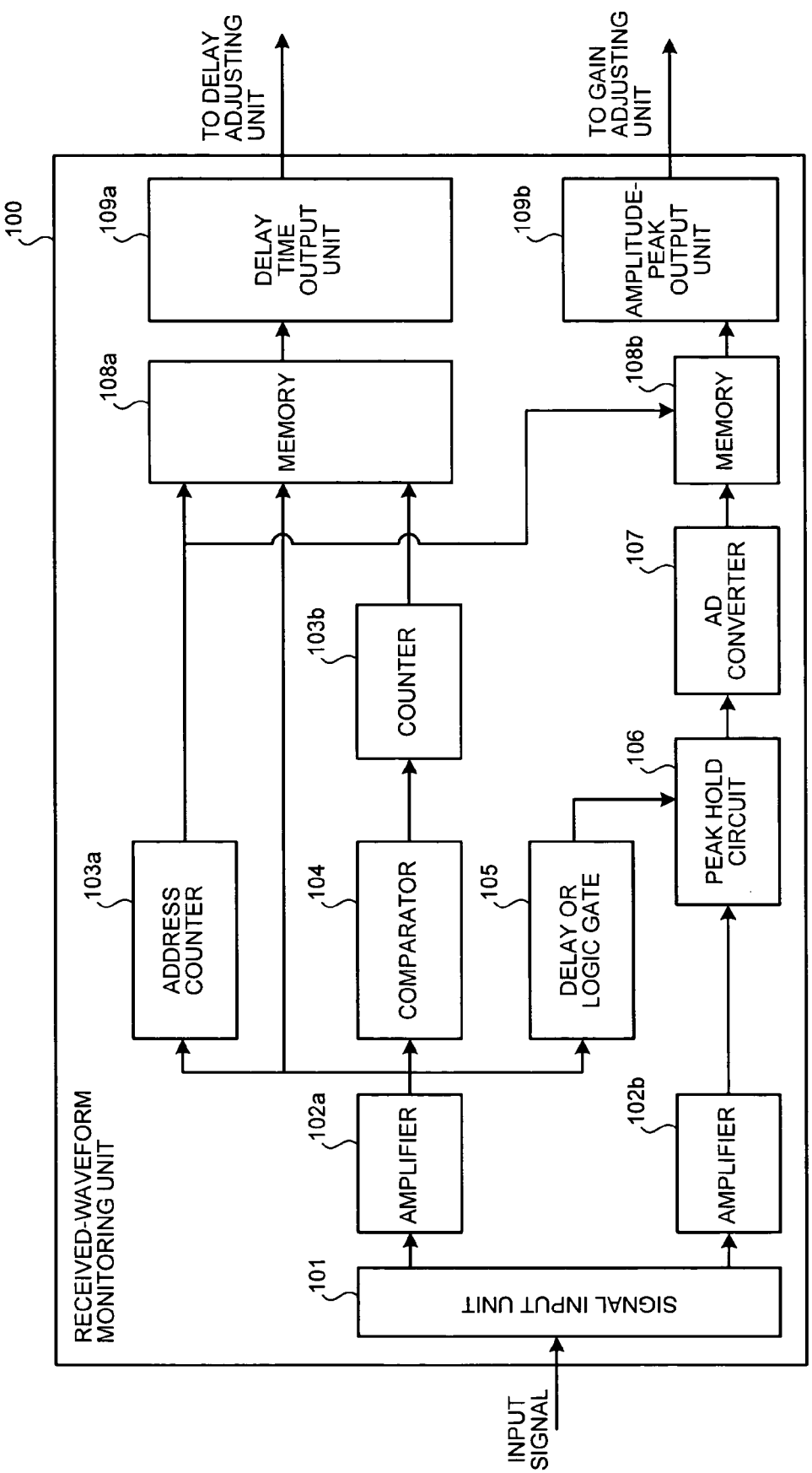
FIG. 6 is a functional block diagram of a constitution of a received waveform monitoring unit.

A constitution of the received-waveform monitoring unit shown in FIGS. 4 and 5 is explained. FIG. 6 is a functional block diagram of the constitution of the received-waveform monitoring unit shown in FIGS. 4 and 5. As shown in the figure, the received-waveform monitoring unit 100 includes a signal input unit 101, amplifiers 102a and 102b, an address counter 103a, a counter 103b, a comparator 104, a DELAY or logic gate 105, a peak hold circuit 106, an AD converter 107, memories 108a and 108b, a delay time output unit 109a, and an amplitude-peak output unit 109b.

An input signal inputted to the signal input unit 101 is branched into a first input signal and a second input signal. The first input signal is used for detecting a delay time and the second input signal is used for detecting an amplitude (gain) peak for calculating a gain attenuation ratio. A gain of the first input signal is amplified by the amplifier 102a and a gain of the second input signal is amplified by the amplifier 102b.

The first input signal with the gain amplified by the amplifier 102a is branched into a signal inputted to the address counter 103a, a signal directly inputted to the memory 108a, a signal inputted to the comparator 104, and a signal inputted to the DELAY or logic gate 105. The address counter 103a, which receives the signal from the amplifier 102a, increments a memory address and passes a memory address (A) counted at detection timing of a rising edge of the signal to the memories 108a and 108b. The comparator 104 clears the counter 103b at arrival timing of a maximum amplitude pulse that arrives first after the counter 103b is cleared last. The counter 103b increments a memory address and passes a memory address (B) counted at clear timing of the counter 103b to the memory 108a. The delay time output unit 109a calculates a delay time T of a reflected wave from the memory addresses (A) and (B) and passes the delay time T to the delay adjusting unit 150.

The DELAY or logic gate 105 inputs a delay wave of the first input signal to the peak hold circuit 106 and detects maximum amplitude of the reflected wave from comparison with the second input signal inputted. The AD converter 107 subjects information on this maximum amplitude to digital conversion and passes the information to the memory 108b. The amplitude-peak output unit 109b calculates reflectance (an attenuation ratio) by calculating a ratio of a maximum amplitude peak of the delay wave to a maximum amplitude peak of a direct wave and passes the reflectance to the gain adjusting unit 160.

The amplifiers 102a and 102b are provided to improve monitoring accuracy for the reflected wave. When the monitoring accuracy is sufficient, the amplifiers 102a and 102b do not have to be provided.

Figure 7:
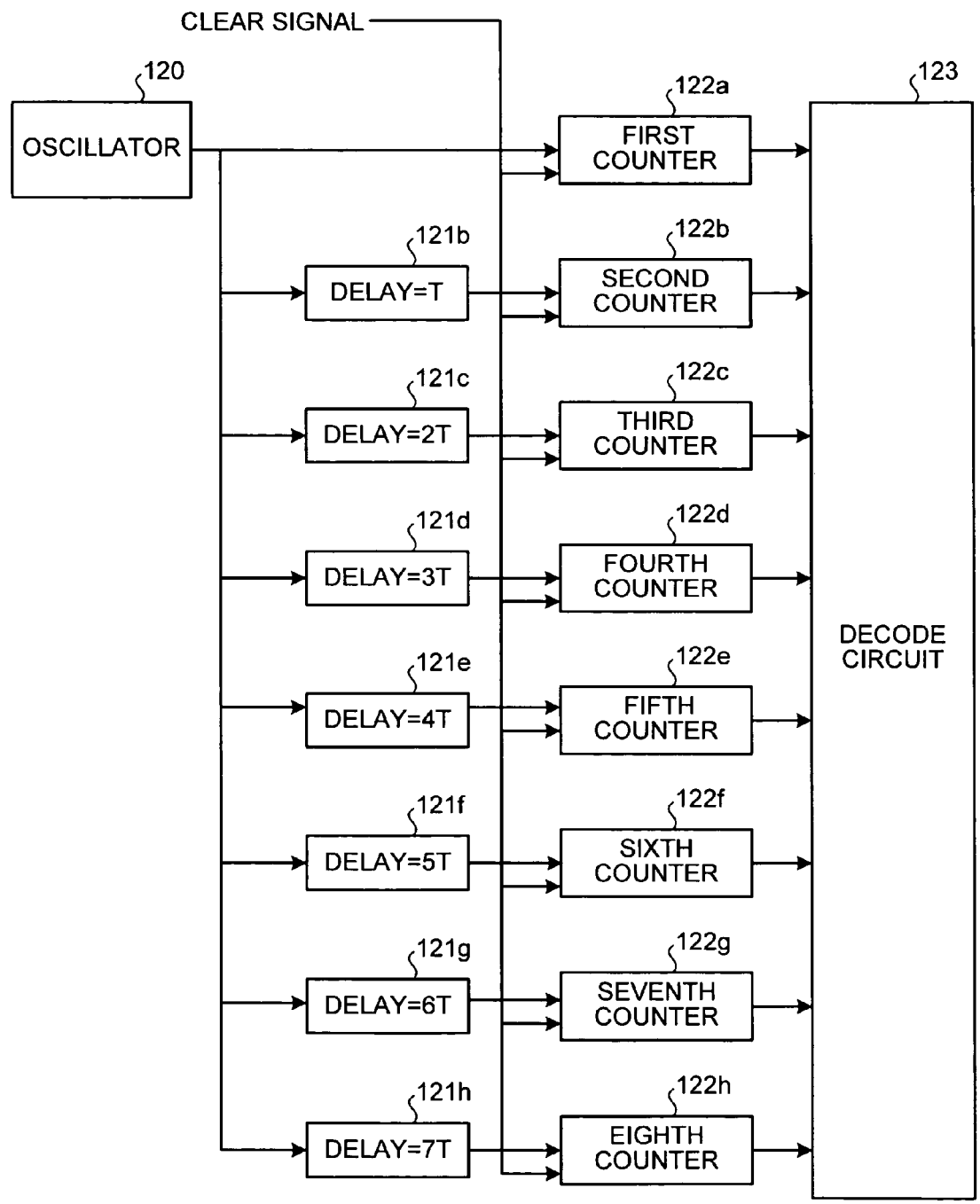
FIG. 7 is a diagram of a schematic constitution of counters.

A constitution of the address counter 103a and the counter 103b shown in FIG. 6 is explained. FIG. 7 is a diagram of a schematic constitution of the address counter 103a and the counter 103b shown in FIG. 6. As shown in the figure, the address counter 103a and the counter 103b include an oscillator 120 with a period 8T, a phase delay unit 121b for delay of time T, a phase delay unit 121c for delay of time 2T, a phase delay unit 121d for delay of time 3T, a phase delay unit 121e for delay of time 4T, a phase delay unit 121f for delay of time 5T, a phase delay unit 121g for delay of time 6T, a phase delay unit 121h for delay of time 7T, a first counter 122a, a second counter 122b, a third counter 122c, a fourth counter 122d, a fifth counter 122e, a sixth counter 122f, a seventh counter 122g, an eighth counter 122h, and a decode circuit 123.

The first to the eighth counters 122a to 122h are identical 1-bit counters and operate at a period 8T. The first counter 122a is directly connected to the oscillator 120 and operates at an original period of the oscillator 120. The second counter 122b is connected to the oscillator 120 via the phase delay unit 121b and operates at a period delayed by T from the original period of the oscillator 120. The third counter 122c is connected to the oscillator 120 via the phase delay unit 121c and operates at a period delayed by 2T from the original period of the oscillator 120. The fourth counter 122d is connected to the oscillator 120 via the phase delay unit 121d and operates at a period delayed by 3T from the original period of the oscillator 120. The fifth counter 122e is connected to the oscillator 120 via the phase delay unit 121e and operates at a period delayed by 4T from the original period of the oscillator 120. The sixth counter 122f is connected to the oscillator 120 via the phase delay unit 121f and operates at a period delayed by 5T from the original period of the oscillator 120. The seventh counter 122g is connected to the oscillator 120 via the phase delay unit 121g and operates at a period delayed by 6T from the original period of the oscillator 120. The eighth counter 122h is connected to the oscillator 120 via the phase delay unit 121h and operates at a period delayed by 7T from the original period of the oscillator 120.

The decode circuit 123 decodes counter count bits inputted from the first to the eight counters 122a to 122h. Input lines for clear signals are connected to the respective counters.

In this way, a clock at which the counters are operable is branched and phases of the counters are delayed to operate the respective counters. This makes it possible to detect a delay time of a reflected wave superimposed on an output wave of a bit rate higher than that at the time when a 1-bit counter is independently used.

The first embodiment of the present invention has been explained. However, the present invention is not limited to the first embodiment. The present invention may be further carried out in various different embodiments within the scope of the technical idea described in claims. In a second embodiment of the present invention, modifications of the first embodiment are described.

Figure 8:
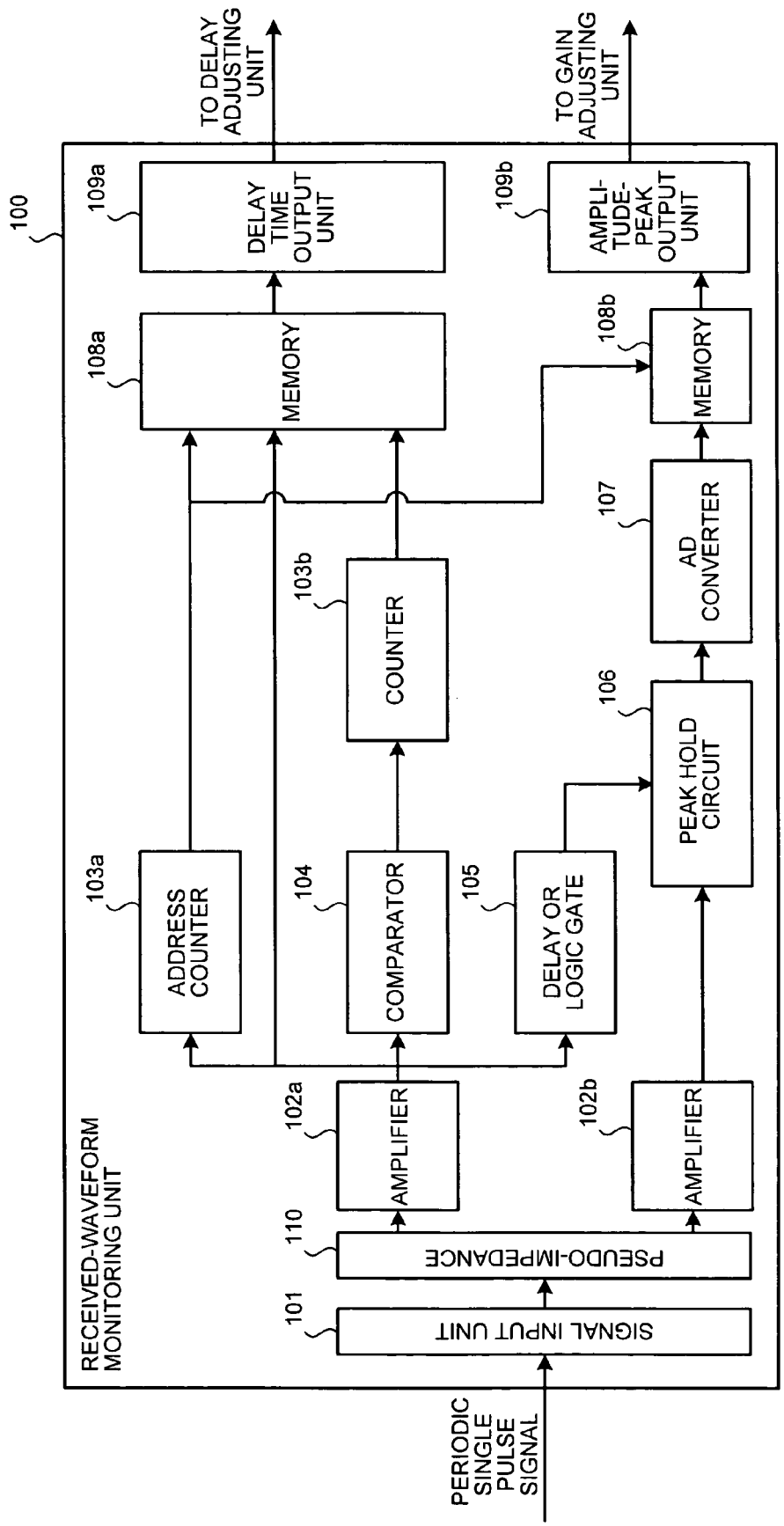
FIGS. 8 to 10 are functional block diagrams of various example of a modification of the constitution of the received waveform monitoring unit.
Figure 9:
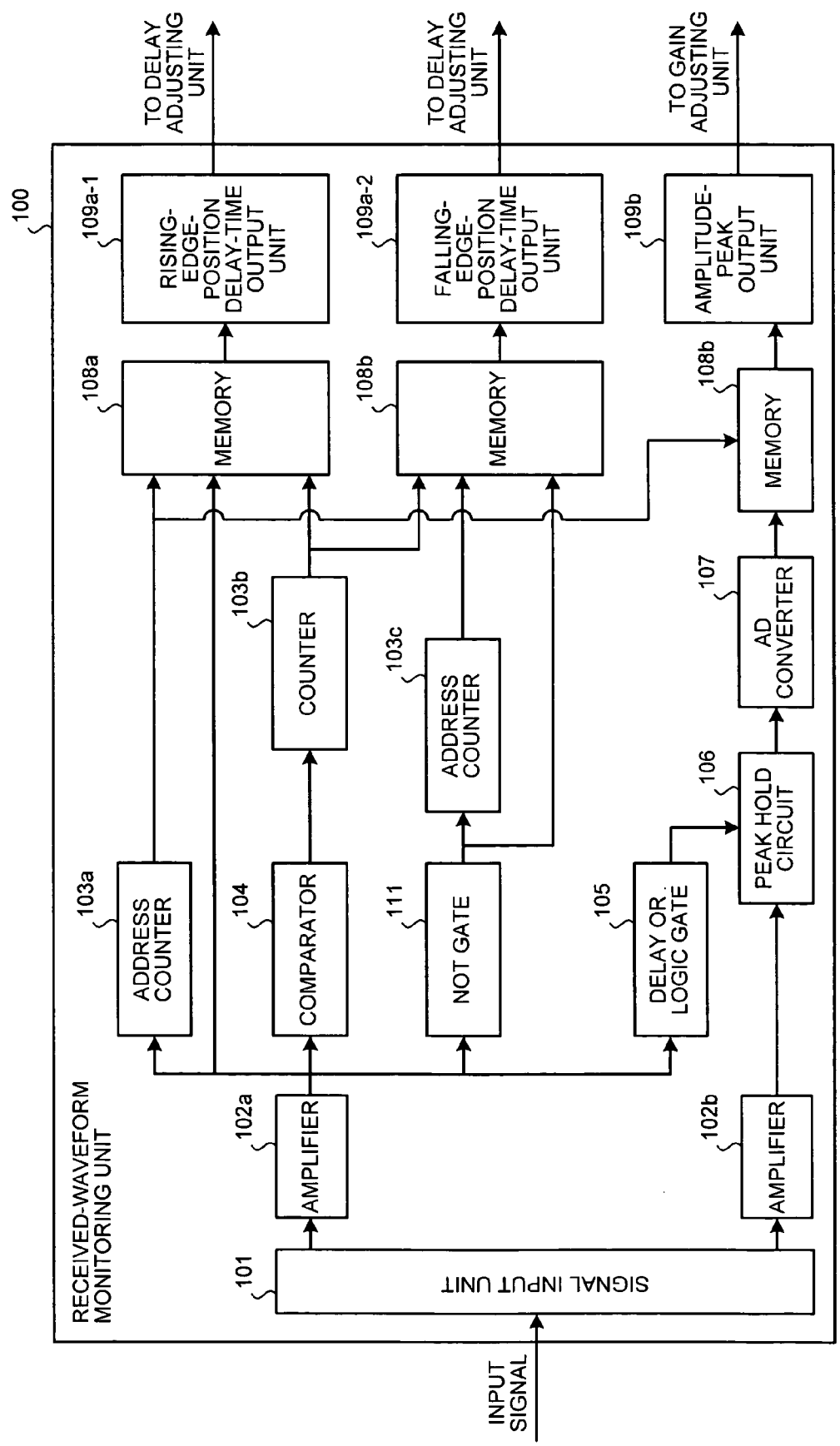
Figure 10:
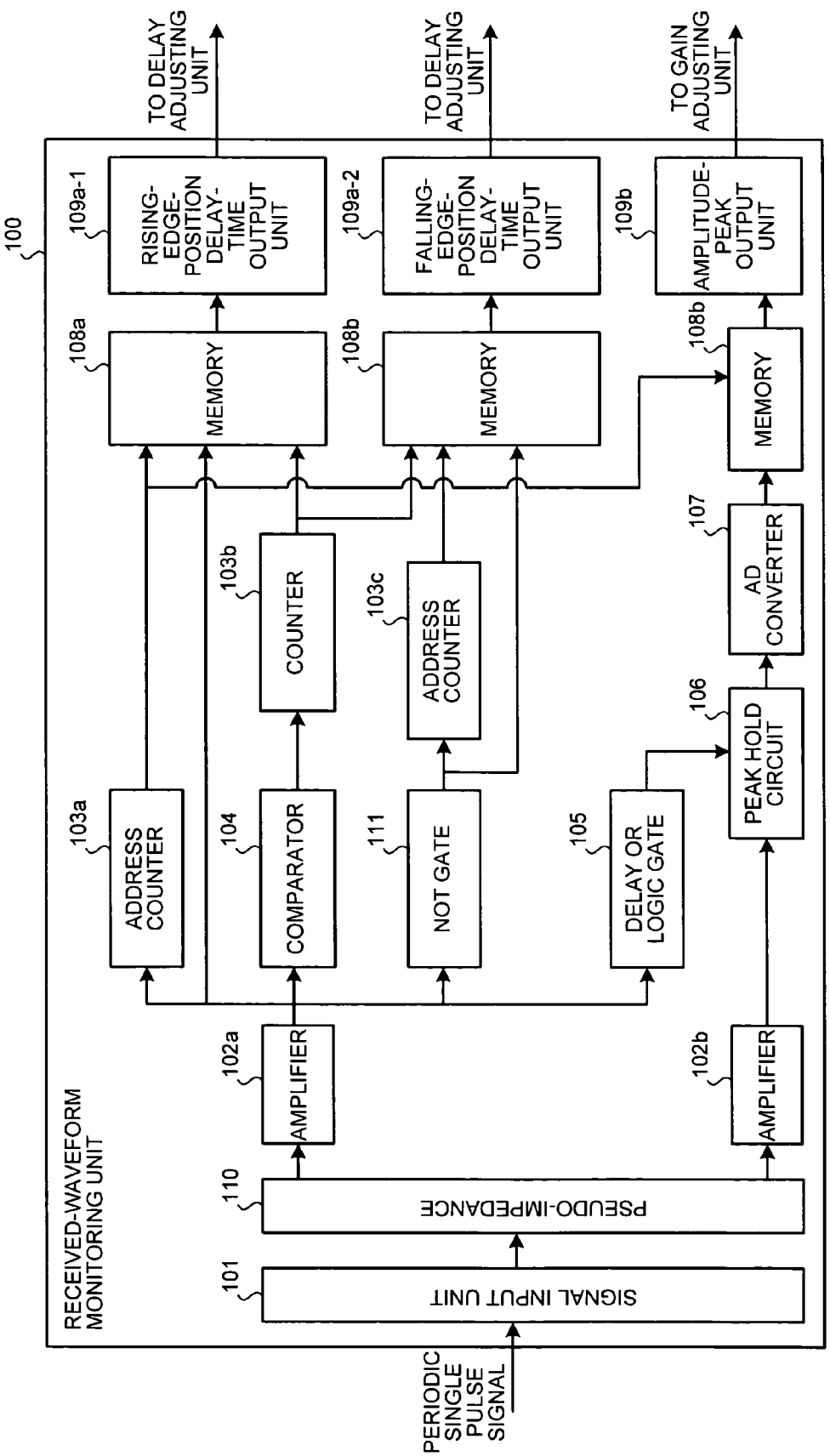

FIGS. 8 to 10 are functional block diagrams of examples of a modification of the constitution of the received-waveform monitoring unit 100 shown in FIG. 6.

In the received-waveform monitoring unit 100 shown in FIG. 8, a pseudo-impedance 110 is provided between the signal input unit 101 and the amplifiers 102a and 102b of the received-waveform monitoring unit 100 in FIG. 6. It is possible to change an input signal inputted to the signal input unit 101 to a periodic single pulse signal (a sample pulse) transmitted as a sample from a pulse generator separate from the transmission side integrated circuit by providing the pseudo-impedance 110. When a characteristic of a delay wave is detected using the sample pulse periodically transmitted, it is possible to promptly cope with a change in impedance affected by an environmental change such as a temperature change.

In the received-waveform monitoring unit 100 shown in FIG. 9, a NOT gate 111 to which a branched signal branched from the amplifier 102a of the received-waveform monitoring unit 100 in FIG. 6 is inputted is added. In this case, like the same manner as the delay time output unit 109a, a rising-edge-position delay-time output unit 109a-1 calculates a delay time $T_1$ at a rising edge of a pulse in. The NOT gate 111 inverts an input signal and passes the inverted signal to the address counter 103c and the memory 109c.

Like the address counter 103a, the address counter 103c can detect a rising edge of a pulse. Since the input signal is the inverted signal, the address counter 103c detects a falling edge of the pulse of the signal before inversion by detecting the rising edge of the pulse. The address counter 103c passes information on timing of the rising edge of the pulse to the memory 108c. Information on the arrival timing of the maximum amplitude pulse is also passed to the memory 108c from the counter 103b. A falling-edge-position delay-time output unit 109a-2 calculates a delay time $T_2$ at the falling edge of the pulse from the information on the timing of the rising edge of the pulse, the information on the arrival timing of the maximum amplitude pulse, and an input wave directly inputted from the NOT gate 111.

Both the delay time $T_1$ at the rising edge of the pulse and the delay time $T_2$ at the falling edge of the pulse are inputted to the delay adjusting unit 150. The delay adjusting unit 150 adopts an average of $T_1$ and $T_2$ as a delay time of the pulse.

In the received-waveform monitoring unit 100 shown in FIG. 10, the pseudo-impedance 110 is provided between the signal input unit 101 and the amplifiers 102a and 102b of the received-waveform monitoring unit 100 in FIG. 9. The purpose of adopting this constitution is as explained concerning the received-waveform monitoring unit 100 in FIG. 8.

FIGS. 11 to 15 are functional block diagrams of modifications of the constitution of the reflected wave cancellation circuit U between the daughter boards connected via the backboard shown in FIG. 5.

Figure 11:
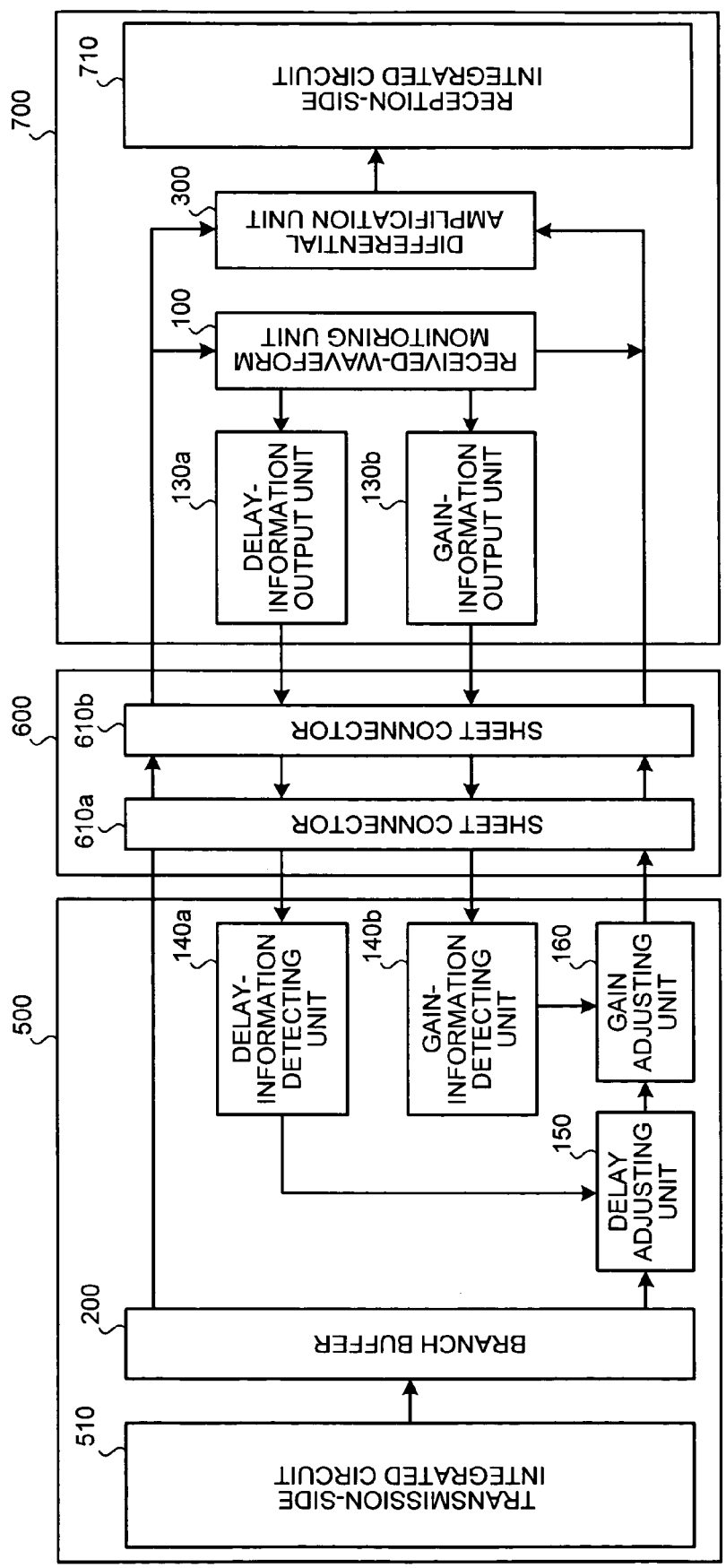
FIGS. 11 to 15 are functional block diagrams of various modification of the constitution of the reflected wave cancellation circuit between the daughter boards connected via the backboard.

In the reflected wave cancellation circuit U shown in FIG. 11, compared with the reflected wave cancellation circuit U shown in FIG. 5, the delay adjusting unit 150 and the gain adjusting unit 160 are arranged on the transmission-side daughter board 500. To input a delay time and reflectance of a reflected wave detected by the received-waveform monitoring unit 100 of the reception-side daughter board 700 to the delay adjusting unit 150 and the gain adjusting unit 160, a delay-information output unit 130a and a gain-information output unit 130b are provided on the reception-side daughter board 700 and a delay-information detecting unit 140a and a gain-information detecting unit 140b are provided on the transmission-side daughter board 500. Delay information of the reflected wave outputted by the received-waveform monitoring unit 100 is passed from the delay-information output unit 130a to the delay-information detecting unit 140a through the sheet connector 610b, the backboard 600, and the sheet connector 610a and, then, inputted to the delay adjusting unit 150. Gain information concerning the reflectance of the reflected wave outputted by the received-waveform monitoring unit 100 is passed from the gain-information output unit 130b to the gain-information detecting unit 140b through the sheet connector 610b, the backboard 600, and the sheet connector 610a and, then, inputted to the gain adjusting unit 160.

Figure 12:
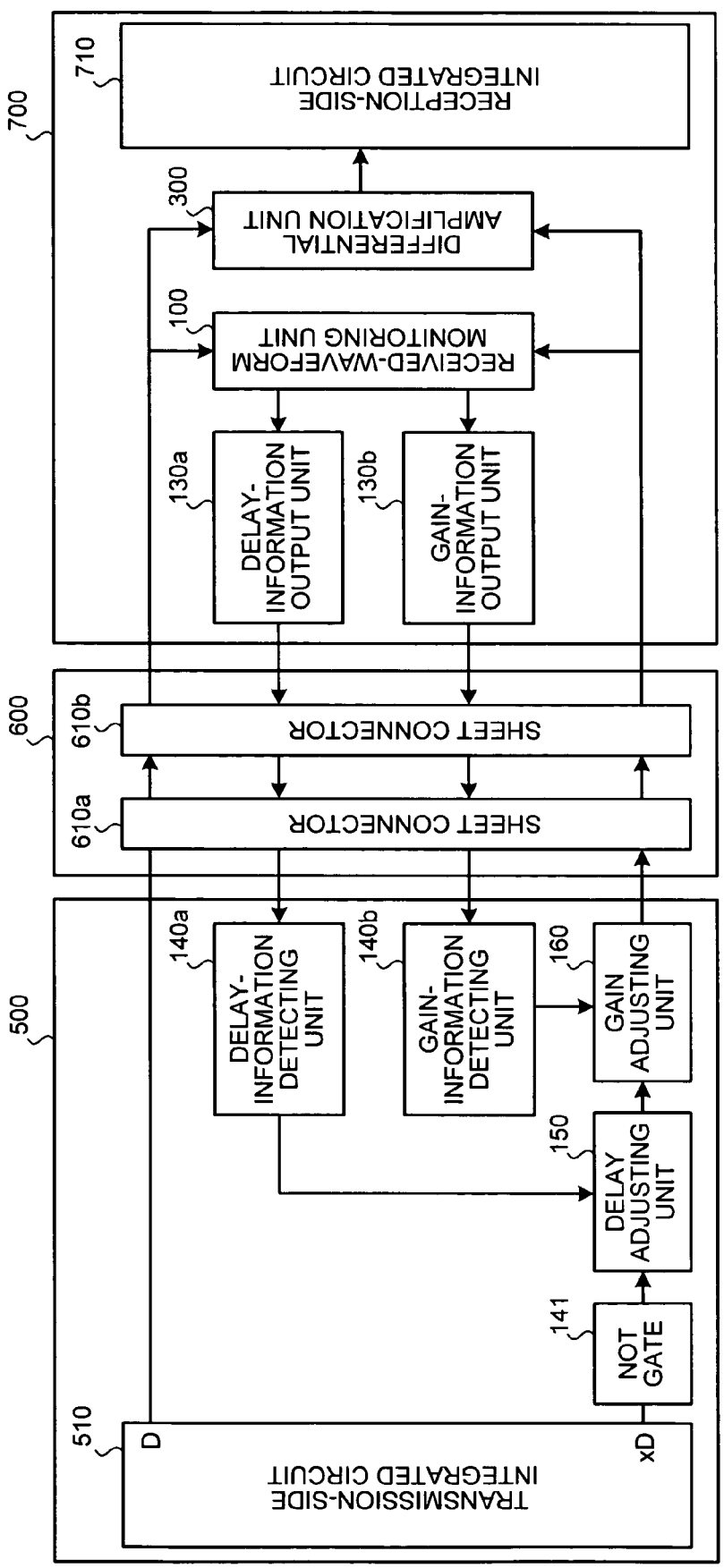

In the reflected wave cancellation circuit U shown in FIG. 12, compared with the reflected wave cancellation circuit U shown in FIG. 11, the transmission side integrated circuit 510 has a signal output terminal D and a inverted signal output terminal xD. Thus, a cancellation wave for a reflected wave is generated using a inverted signal outputted from the inverted signal output terminal xD. The inverted signal outputted from the inverted signal output terminal xD is passed through a NOT gate 141 to be further inverted. The inverted signal coincides with a signal outputted from the signal output terminal D. Thus, a result of monitoring a waveform of this signal with the received-waveform monitoring unit 100 is used by the delay adjusting unit 150 and the gain adjusting unit 160 to cancel the reflected wave.

Figure 13:
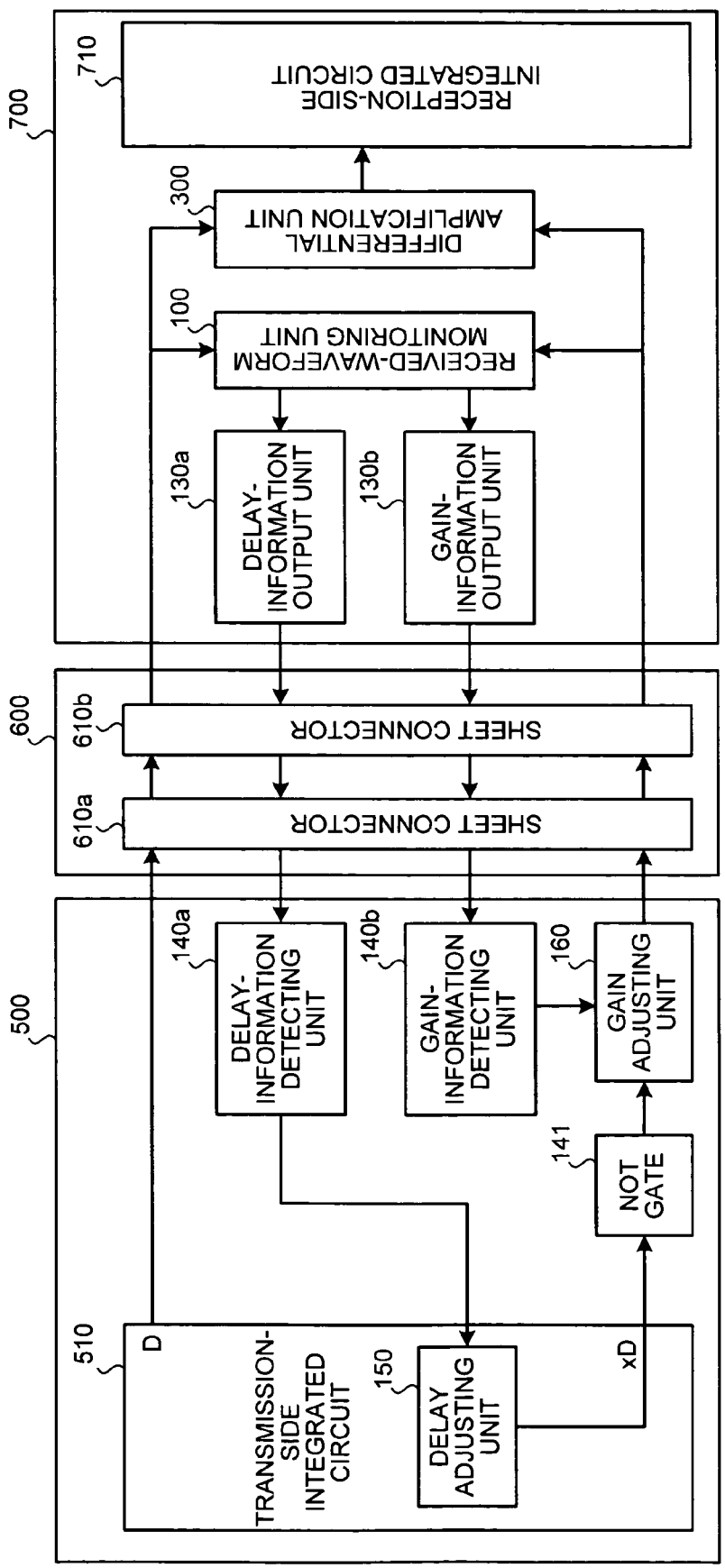

In the reflected wave cancellation circuit U shown in FIG. 13, compared with the reflected wave cancellation circuit U shown in FIG. 12, the transmission side integrated circuit 510 further includes the delay adjusting unit 150. It is possible to further reduce the size of the reflected wave cancellation circuit by using the transmission side integrated circuit 510 that includes the inverted signal output terminal xD and the delay adjusting unit 150.

Figure 14:
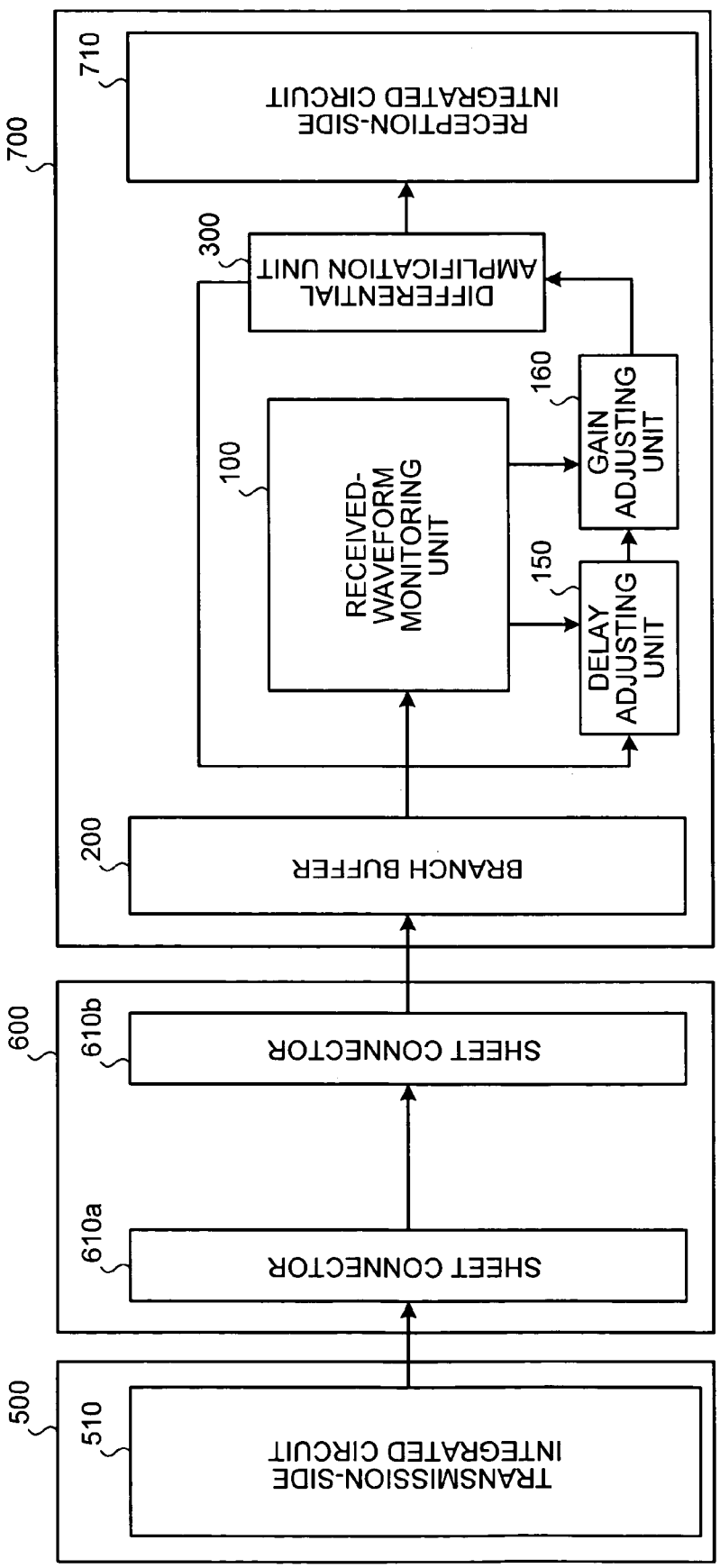

In the reflected wave cancellation circuit U shown in FIG. 14, compared with the reflected wave cancellation circuit U shown in FIG. 5, the reception-side daughter board 700 includes the branch buffer 200. The branch buffer 200 may be provided on the reception-side daughter board 700 or the transmission-side daughter board 500.

As a channel between the transmission-side daughter board 500 and the reception-side daughter board 700 explained in the modifications of the embodiment, one channel may be shared in both transmission directions or different channels may be used in the respective transmission directions.

Figure 15:
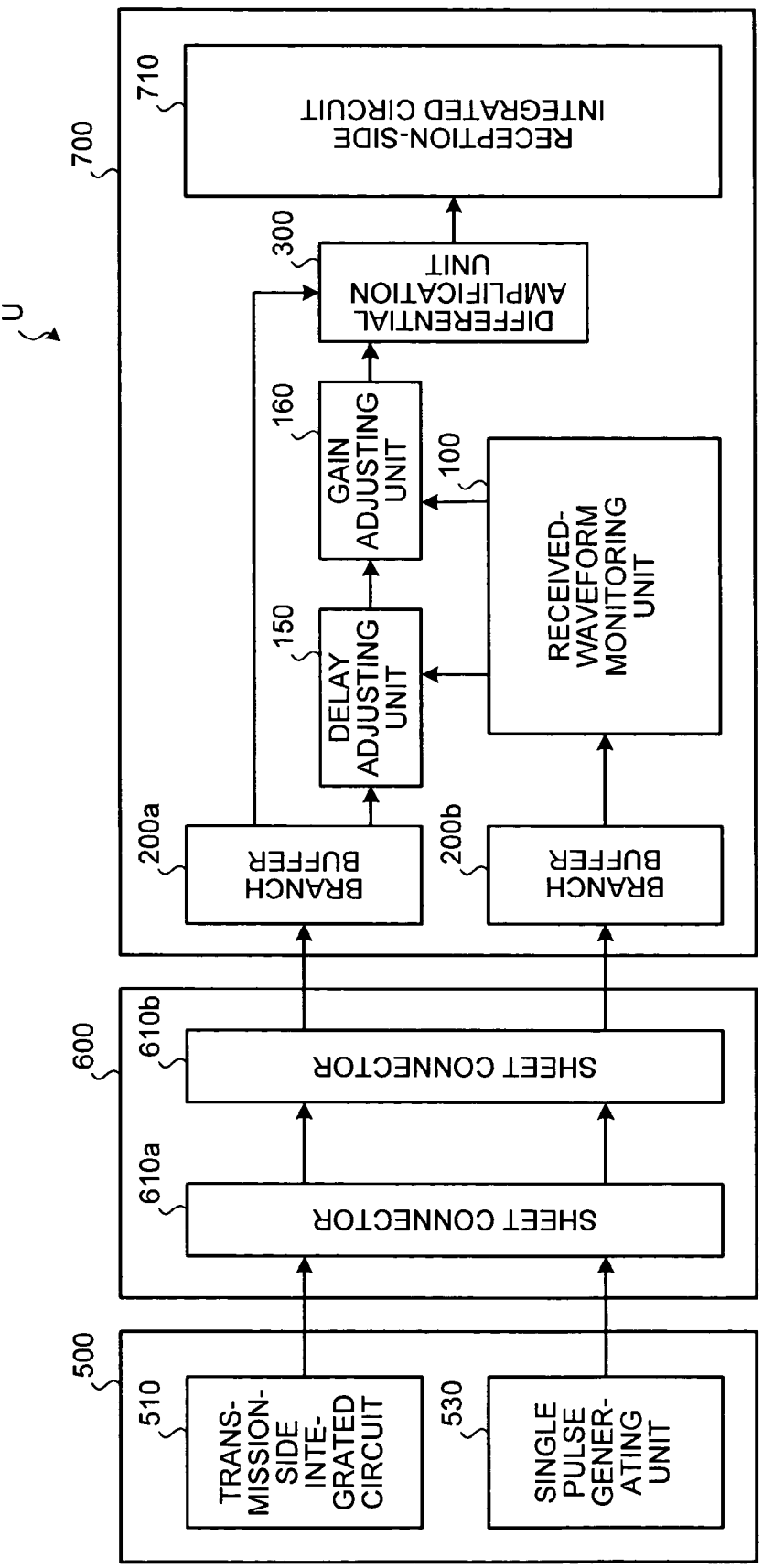

In the reflected wave cancellation circuit U shown in FIG. 15, compared with the reflected wave cancellation circuit U shown in FIG. 14, the transmission-side daughter board 500 includes a single pulse generating unit 530. The single pulse generating unit 530 periodically or singly generates a sample pulse that has a characteristic identical with a signal wave generated by the transmission side integrated circuit 510. The single pulse generated by the pulse generating unit 530 is inputted to a branch buffer 200b through the sheet connector 610a, the backboard 600, and the sheet connector 610b. The signal wave generated by the transmission side integrated circuit 510 is inputted to a branch buffer 200a through the sheet connector 610a, the backboard 600, and the sheet connector 610b. The branch buffer 200a and the branch buffer 200b have identical impedance. In this way, when a dedicated wiring for transmitting the single pulse is provided, the single pulse has to be passed through a branch buffer having impedance identical with that of a branch buffer for the signal wave generated by the transmission side integrated circuit 510 such that the single pulse has conditions identical with those of the signal wave. The received-waveform monitoring unit 100 of the reflected wave cancellation circuit U shown in FIG. 15 adopts the constitution shown in FIG. 8 or 11. When a characteristic of a delay wave is detected using the sample pulse periodically transmitted in this way, it is possible to quickly cope with a change in impedance affected by an environmental change such as a temperature change.

Figure 16:
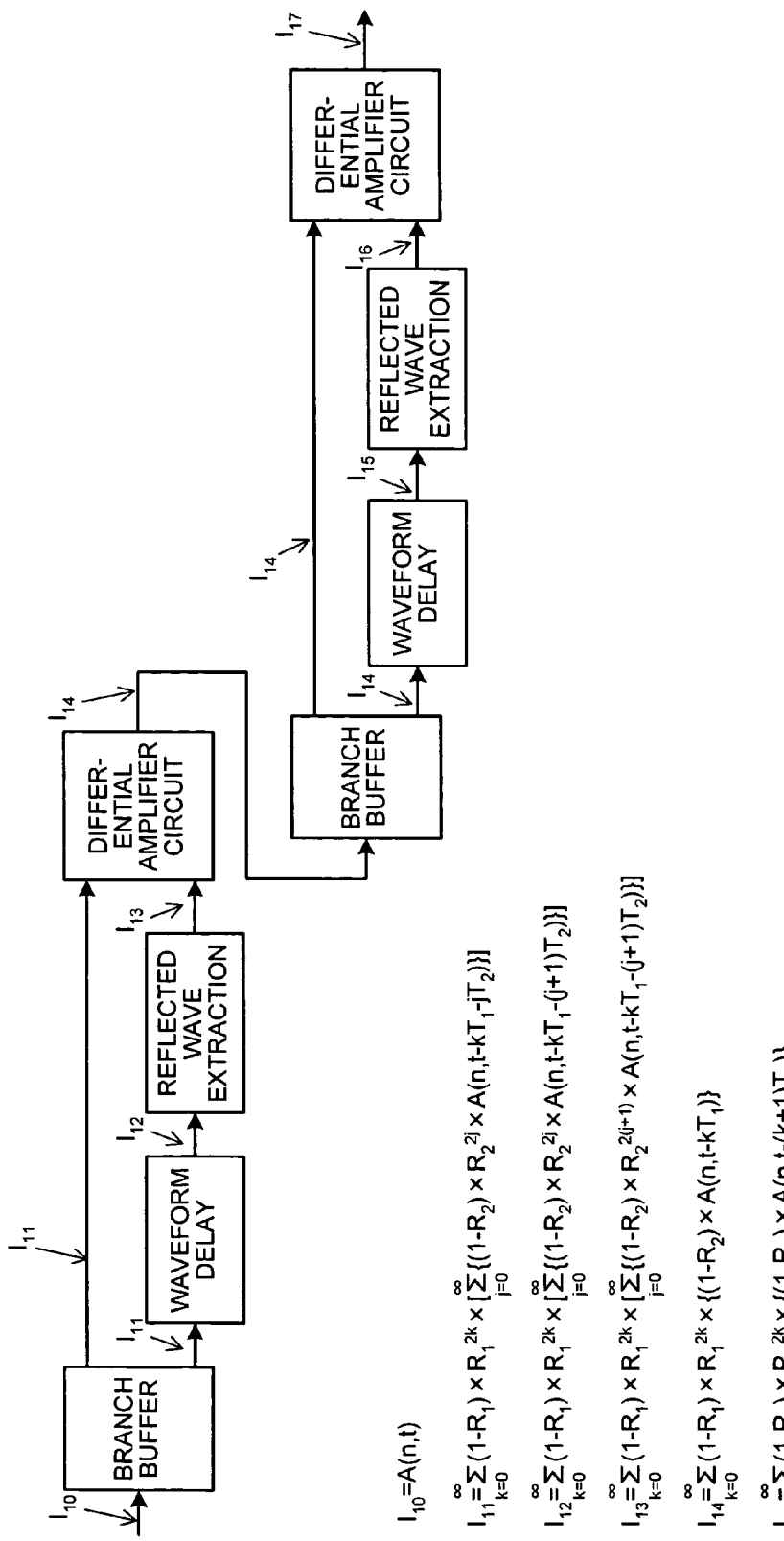
FIG. 16 is a diagram for explaining a cancellation method for a complex reflected wave.

A cancellation method and a multi-stage constitution of a cancellation circuit for a complex reflected wave at the time when the reflected wave is a complex reflection wave are explained. FIG. 16 is a diagram for explaining the cancellation method for the complex reflected wave.

The complex reflected wave is generated by superimposing a plurality of reflected waves having different delay times and reflectances one on top of another. Since the superimposition is a linear addition, it is possible to sequentially cancel the respective reflected waves by forming different reflected wave cancellation circuits in the multi-stage constitution.

As shown in FIG. 16, an output wave represented by $I_{10}=A(n,t)$ is inputted to a branch buffer and transmitted waves $I_{11}$ with reflected waves complexly superimposed thereon are branched in two directions. The transmitted waves $I_{11}$ are represented by Equation (9).

$$I_{11} = \sum_{k=0}^{\infty} (1-R_1) \times R_1^{2k} \times \left[ \sum_{j=0}^{\infty} \left\{ \begin{array}{c} (1-R_2) \times R_2^{2j} \times \\ A(n, t-kT_1 - jT_2) \end{array} \right\} \right] \quad (9)$$

One transmitted wave $I_{11}$ is directly inputted to a differential amplifier circuit. The other transmitted wave $I_{11}$ is subjected to waveform delay processing first. The waveform delay processing is processing for delaying respective terms of $I_{11}$ by $T_2$. Consequently, a transmitted wave $I_{12}$ subjected to the waveform delay processing is represented by Equation (10).

$$I_{12} = \sum_{k=0}^{\infty} (1-R_1) \times R_1^{2k} \times \left[ \sum_{j=0}^{\infty} \left\{ \begin{array}{c} (1-R_2) \times R_2^{2j} \times \\ A(n, t-kT_1 - (j+1)T_2) \end{array} \right\} \right] \quad (10)$$

The transmitted wave $I_{12}$ is subjected to reflected wave extraction processing. In the reflected wave extraction processing, a reflection component $I_{13}$ of the transmitted wave $I_{12}$ is calculated by multiplying the transmitted wave $I_{12}$ by reflectance $R_2^2$. Consequently, a transmitted wave $I_{13}$ subjected to the reflected wave extraction processing is represented by Equation (11).

$$I_{13} = \sum_{k=0}^{\infty} (1-R_1) \times R_1^{2k} \times \left[ \sum_{j=0}^{\infty} \left\{ \begin{array}{c} (1-R_2) \times R_2^{2(j+1)} \times \\ A(n, t-kT_1 - (j+1)T_2) \end{array} \right\} \right] \quad (11)$$

The transmitted wave $I_{13}$ is inputted to the differential amplifier circuit, subjected to output inversion, and superimposed on the transmitted wave $I_{11}$ separately inputted. In other words, by calculating $I_{11}-I_{13}$, it is possible to extract a transmitted wave $I_{14}$ with reflected waves having the delay time $T_2$ and the reflectance $R_2$ cancelled. The transmitted wave $I_{14}$ is represented by Equation (12).

$$I_{14} = \sum_{k=0}^{\infty} (1-R_1) \times R_1^{2k} \times \{(1-R_2) \times A(n, t-kT_1)\} \quad (12)$$

Similarly, the transmitted wave $I_{14}$ is inputted to a branch buffer and the transmitted waves $I_{14}$ with reflected waves with the delay time $T_1$ and reflectance $R_1$ superimposed thereon is branched in two directions. One transmitted wave $I_{14}$ is directly inputted to a differential amplifier circuit. The other transmitted wave $I_{14}$ is subjected to waveform delay processing first. The waveform delay processing is processing for delaying respective terms of $I_{14}$ by $T_1$. Consequently, a transmitted wave $I_{15}$ subjected to the waveform delay processing is represented by Equation (13).

$$I_{15} = \sum_{k=0}^{\infty} (1-R_1) \times R_1^{2k} \times \{(1-R_2) \times A(n, t-(k+1)T_1)\} \quad (13)$$

The transmitted wave $I_{15}$ is subjected to reflected wave extraction processing. In the reflected wave extraction processing, a reflection component $I_{16}$ of the transmitted wave $I_{15}$ is calculated by multiplying the transmitted wave $I_{15}$ by reflectance $R_1^2$. Consequently, a transmitted wave $I_{16}$ subjected to the reflected wave extraction processing is represented by Equation (14).

$$I_{16} = \sum_{k=0}^{\infty} (1-R_1) \times R_1^{2(k+1)} \times \{(1-R_2) \times A(n, t-(k+1)T_1)\} \quad (14)$$

The transmitted wave $I_{16}$ is inputted to the differential amplifier circuit, subjected to output inversion, and superimposed on the transmitted wave $I_{14}$ separately inputted. In other words, by calculating $I_{14}-I_{16}$, it is possible to extract a signal wave $I_{17}$ with reflected waves having the delay time $T_1$ and the reflectance $R_1$ cancelled. The signal wave $I_{17}$ is represented by Equation (15).

$$I_{17}=(1-R_1)\times(1-R_2)\times A(n,t) \quad (15)$$

Figure 17:
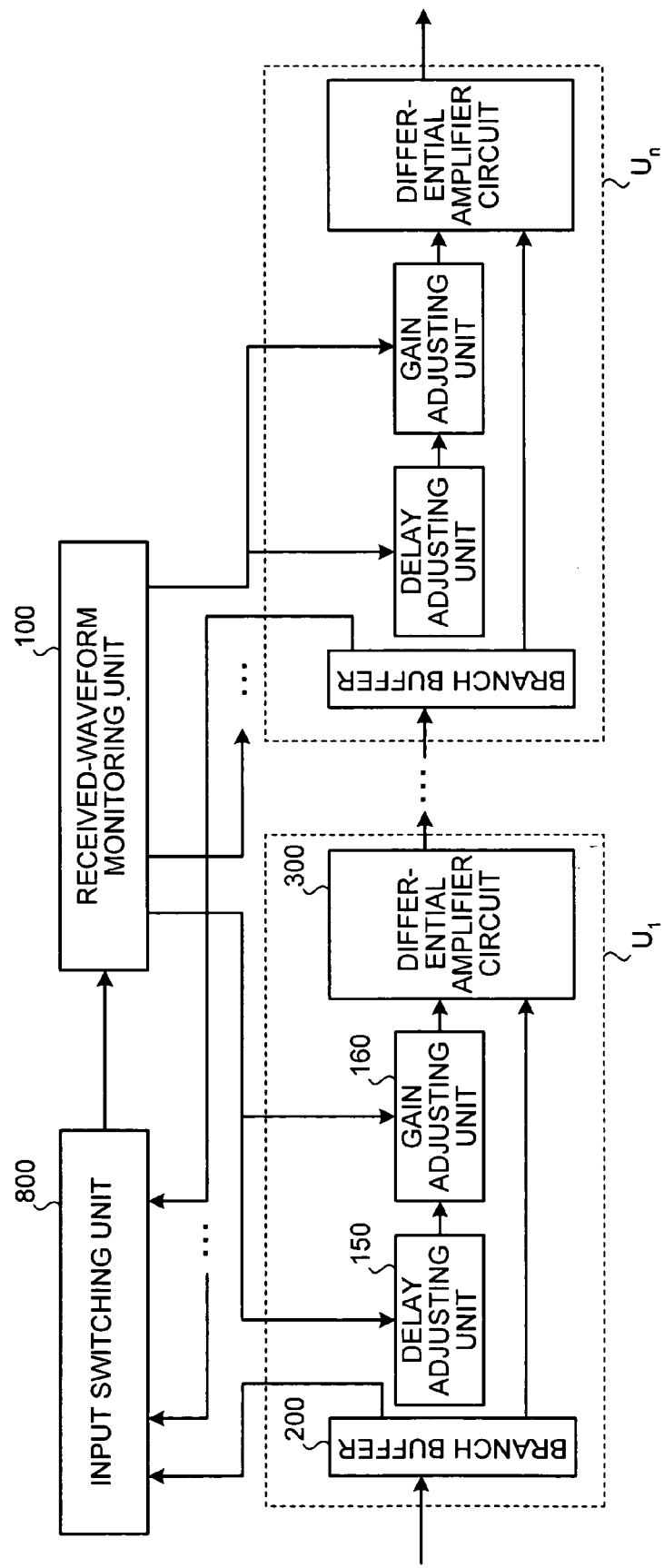
FIG. 17 is a functional block diagram of a cancellation circuit for the complex reflected wave.

A constitution of a multi-stage cancellation circuit that realizes the cancellation method for a complex reflected wave shown in FIG. 16 is explained. FIG. 17 is a functional block diagram of the multi-stage cancellation circuit that realizes the cancellation method for a complex reflected wave shown in FIG. 16. As shown in the figure, in each of cancellation circuits $U_1$ to $U_n$, one output of the branch buffer 200 included in the cancellation circuit is connected to an input switching unit 800. The input switching unit 800 selectively passes a branch signal from any one of the cancellation circuits $U_1$ to $U_n$ to the received-waveform monitoring unit 100. The cancellation circuit, from which the branch signal is passed to the received-waveform monitoring unit 100, closes and operates.

The received-waveform monitoring unit 100, to which the branch signal is passed, passes a delay time and reflectance, which a result of received waveform monitoring, to the delay adjusting unit 150 and the gain adjusting unit 160 of each of the cancellation circuits $U_1$ to $U_n$. It is possible to form a plurality of cancellation circuits in the multi-stage constitution in a small size by connecting the cancellation circuits $U_1$ to $U_n$ in parallel to the received-waveform monitoring unit 100 using the input switching unit 800 in this way.

The reflected wave cancellation method and the reflected wave cancellation circuit of the present invention have been explained in the first and the second embodiments. It is possible to use both error correction and code conversion for a signal exchanged between the transmission-side daughter board 500 and the reception-side daughter board 700. In particular, it is effective to use the error correction to further reduce an influence due to arrival of a reflected wave when a single pulse is transmitted.

In the first and the second embodiments, for convenience of explanation, the functional block is divided into the transmission-side daughter board 500 and the reception-side daughter board 700. However, it goes without saying that both the functions on the transmission side and the reception side are mounted on one daughter board.

In principle, it is also possible to apply the present invention to removal of an influence of a reflected wave in a channel including a plurality of branches like an electric power line network. In other words, the present invention is applicable when there is an influence of a reflected wave in a channel for carrying electricity like electric power and electric signals.

According to an aspect of the present invention, in the transmission between the substrate units via the backboard, it is possible to cancel reflected waves generated in the connector sections that connect the backboard and the substrate units. This makes it possible to prevent an influence of the reflected waves in high-speed communication of such transmission and secure and improve reliability of the communication.

Moreover, the signal wave for cancellation wave generation is the sample pulse periodically generated and transmitted from the transmission-side substrate unit. This makes it possible to quickly grasp characteristics of the reflected waves, which change according to a change in a surrounding environment, and accurately cancel the reflected waves.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A backboard transmission method comprising:
    monitoring a signal wave passed between a transmission-side substrate unit and a reception-side substrate unit to detect a delay time and a gain of a reflected wave with respect to the signal wave, the transmission-side substrate unit and the reception-side substrate unit being mounted with integrated circuits and connected to a backboard via respective connectors, the reflected wave being a wave generated when a transmitted wave from the transmission-side substrate unit to the reception-side substrate unit is reflected on sheet connectors of the reception-side substrate unit and the transmission-side substrate unit, the signal wave being the transmitted wave superimposed by the reflected wave;
    performing delay adjustment with respect to a cancellation wave having a characteristic identical with that of the signal wave based on the delay time detected at the monitoring;
    performing gain adjustment with respect to the cancellation wave based on the gain detected at the monitoring; and
    superimposing the cancellation wave subjected to the delay adjustment and the gain adjustment on the signal wave thereby canceling the reflected wave.

2. The backboard transmission method according to claim 1, wherein the cancellation wave is a sample pulse that is periodically generated in the transmission-side substrate unit and has passed through a pseudo-impedance.

3. The backboard transmission method according to claim 1, wherein the reception-side substrate unit performs the monitoring, the delay adjustment, the gain adjustment, and the superimposing.

4. The backboard transmission method according to claim 1, wherein
    the reception-side substrate unit performs the monitoring and the superimposing, and
    the transmission-side substrate unit performs the delay adjustment and the gain adjustment.

5. The backboard transmission method according to claim 4, wherein the integrated circuit performs the delay adjustment.

6. The backboard transmission method according to claim 1, wherein
    the transmission-side substrate unit performs inverting and outputting a transmitted wave output from an inversion output terminal of the integrated circuit, which includes an output terminal and the inversion output terminal, and
    the inverted transmitted wave is subjected to the delay adjustment and the gain adjustment to generate the cancellation wave.

7. The backboard transmission method according to claim 1, wherein the transmission-side substrate unit performs branching of the cancellation wave from the transmitted wave.

8. The backboard transmission method according to claim 1, wherein the reception-side substrate unit performs branching of the cancellation wave from the signal wave.

9. The backboard transmission method according to claim 1, wherein
    the monitoring includes detecting a rising edge time and a falling edge time of a pulse of the reflected wave, and
    the delay adjustment includes performing delay adjustment with respect to the cancellation wave using an average of the rising edge time and the falling edge time as the delay time.

10. A backboard transmission apparatus comprising:
    a signal-wave monitoring unit that monitors a signal wave passed between a transmission-side substrate unit and a reception-side substrate unit and detects a delay time and a gain of a reflected wave with respect to the signal wave, the transmission-side substrate unit and the reception-side substrate unit being mounted with integrated circuits and connected to a backboard via respective connectors, the reflected wave being a wave generated when a transmitted wave from the transmission-side substrate unit to the reception-side substrate unit is reflected on sheet connectors of the reception-side substrate unit and the transmission-side substrate unit, the signal wave being the transmitted wave superimposed by the reflected wave;
    a delay adjusting unit that performs delay adjustment with respect to a cancellation wave having a characteristic identical with that of the signal wave based on the delay time detected by the signal-wave monitoring unit;
    a gain adjusting unit that performs gain adjustment with respect to the cancellation wave based on the gain detected by the signal-wave monitoring unit; and
    a reflected-wave canceling unit that superimposes the cancellation wave subjected to the delay adjustment by the delay adjusting unit and the gain adjustment by the gain adjusting unit on the signal wave thereby canceling the reflected wave.

11. The backboard transmission apparatus according to claim 10, further comprising:
 a sample-pulse generating unit that periodically generates a sample pulse; and
 a pseudo-impedance that converts the sample pulse into the cancellation wave.

12. The backboard transmission apparatus according to claim 10, wherein the reception-side substrate unit includes the signal-wave monitoring unit, the delay adjusting unit, the gain adjusting unit, and the reflected-wave canceling unit.

13. The backboard transmission apparatus according to claim 10, wherein
 the reception-side substrate unit includes the signal-wave monitoring unit and the reflected-wave canceling unit, and
 the transmission-side substrate unit includes the delay adjusting unit and the gain adjusting unit.

14. The backboard transmission apparatus according to claim 13, wherein the integrated circuit includes the delay adjusting unit.

15. The backboard transmission apparatus according to claim 10, wherein
 the transmission-side substrate unit further includes an inversion output unit that further inverts and outputs a transmitted wave output from an inversion output terminal of the integrated circuit, which includes an output terminal and the inversion output terminal, and
 the delay adjusting unit and the gain adjusting unit subject the transmitted wave inverted and output by the inversion output unit to the delay adjustment and the gain adjustment respectively to generate the cancellation wave.

16. The backboard transmission apparatus according to claim 10, wherein the transmission-side substrate unit includes a branching unit that branches the cancellation wave from the transmitted wave.

17. The backboard transmission apparatus according to claim 10, wherein the reception-side substrate unit includes a branching unit that branches the cancellation wave from the signal wave.

18. The backboard transmission apparatus according to claim 10, wherein
 the signal-wave monitoring unit detects a rising edge time and a falling edge time of a pulse of the reflected wave, and
 the delay adjusting unit performs delay adjustment with respect to the cancellation wave using an average of the rising edge time and the falling edge time as the delay time.

19. A substrate unit comprising:
 a signal-wave monitoring unit that monitors a signal wave passed between the substrate unit and other substrate unit and detects a delay time and a gain of a reflected wave with respect to the signal wave, the substrate unit and the other substrate unit being mounted with integrated circuits and connected to a backboard via respective connectors, the reflected wave being a wave generated when a transmitted wave from the transmission-side substrate unit to the reception-side substrate unit is reflected on sheet connectors of the substrate unit and the other substrate unit, the signal wave being the transmitted wave superimposed by the reflected wave;
 a delay adjusting unit that performs delay adjustment with respect to a cancellation wave having a characteristic identical with that of the signal wave based on the delay time detected by the signal-wave monitoring unit;
 a gain adjusting unit that performs gain adjustment with respect to the cancellation wave based on the gain detected by the signal-wave monitoring unit; and
 a reflected-wave canceling unit that superimposes the cancellation wave subjected to the delay adjustment by the delay adjusting unit and the gain adjustment by the gain adjusting unit on the signal wave thereby canceling the reflected wave.

20. The substrate unit according to claim 19, further comprising:
 a sample-pulse generating unit that periodically generates a sample pulse; and
 a pseudo-impedance that converts the sample pulse into the cancellation wave.

21. The substrate unit according to claim 20, further comprising a sample pulse generating unit that generates the sample pulse to be transmitted to the other substrate unit.

22. The substrate unit according to claim 20, wherein the integrated circuit mounted on the substrate unit includes the delay adjusting unit.

23. The substrate unit according to claim 19, further comprising an inversion output unit that further inverts and outputs a transmitted wave output from an inversion output terminal of the integrated circuit mounted on the substrate unit, which has an output terminal and the inversion output terminal, to be transmitted to the other substrate unit.

24. The substrate unit according to claim 19, further comprising a branching unit that branches the cancellation wave from the transmitted wave, wherein
 the substrate unit transmits the transmitted wave and the cancellation wave to the other substrate unit.

25. The substrate unit according to claim 19, further comprising a branching unit that branches a cancellation wave from a signal wave received from the other substrate unit.

26. The substrate unit according to claim 19, wherein
 the signal-wave monitoring unit detects a rising edge time and a falling edge time of a pulse of the reflected wave, and
 the delay adjusting unit performs delay adjustment with respect to the cancellation wave using an average of the rising edge time and the falling edge time as the delay time.

27. The substrate unit according to claim 19, wherein the signal-wave monitoring unit includes a counter in which a predetermined integer number of 1-bit counters are arranged for an oscillator that has a period the predetermined integer times as long as the delay time, the counter being capable of detecting the delay time at accuracy the predetermined integer times as high as that of the 1-bit counters by cyclically actuating the 1-bit counters at the every delay time.

* * * * *